United States Patent [19]

Shintani

[11] 4,008,194
[45] Feb. 15, 1977

[54] COMPOSITIONS FOR PLUGS OF REFRACTORY MATERIAL

[75] Inventor: Tsuneo Shintani, Kitakyushu, Japan

[73] Assignee: Kurosaki Refractories Co., Ltd., Fukuoka, Japan

[22] Filed: Nov. 18, 1975

[21] Appl. No.: 632,946

[30] Foreign Application Priority Data

Nov. 27, 1974 Japan .......................... 49-136677

[52] U.S. Cl. .............................. 260/28 R; 106/55; 106/56; 266/272; 266/273
[51] Int. Cl.² ................. C08L 95/00; C04B 35/66; C21B 7/12
[58] Field of Search ............... 106/55, 56; 266/42; 260/28 R

[56] References Cited

UNITED STATES PATENTS

| | | | |
|---|---|---|---|
| 2,855,318 | 10/1958 | Kerla | 106/55 |
| 3,291,872 | 12/1966 | Brown et al. | 106/56 X |
| 3,496,256 | 2/1970 | Boquist | 106/56 X |
| 3,607,809 | 9/1971 | Elby | 266/42 X |
| 3,702,771 | 11/1972 | Brown et al. | 106/55 |

Primary Examiner—Winston A. Douglas
Assistant Examiner—William G. Wright
Attorney, Agent, or Firm—Frank J. Jordan

[57] ABSTRACT

New compositions for refractory plugs to plug the tapholes of blast furnaces which exhibit less tendency to stiffen and to burn with the emission of heavy black smoke in use are prepared by adding 5–30 parts by weight of a petroleum pitch which has a high softening point and 10–30 parts by weight of dihydric alcohol or its polymer to 100 parts by weight of a conventional refractory aggregate composition and mixing the thus combined constituents to form a mixture.

6 Claims, 1 Drawing Figure

COMPOSITIONS FOR PLUGS OF REFRACTORY MATERIAL

BACKGROUND OF THE INVENTION

This invention relates to compositions for plugs of refractory materials used to plug the tapholes of blast furnaces, and especially to a binding material which is a component in the compositions.

In the operation of blast furnaces, it is custormary to retain molten material within the furnaces by plugs of refractory material which have been inserted into discharge orifices or "tapholes" of such furnaces in a plastic condition and then allowed to harden, so as to form an integral portion of the furnace retaining wall. When it is desired to withdraw the molten material from the furnace, the refractory plug must be broken and removed.

Generally speaking, "mud" is the term used to refer to the compositions of refractory material for plugs. However, in the present specification, that term will not be used. Rather, the term, "composition for refractory plugs" will be used.

To date, the material used to plug the tapholes of blast furnaces, that is, the composition for refractory plugs, has consisted of a composite of at least one refractories aggregate and at least one binding material. The refractories aggregates which have been used are clay, chamotte, pyrophyllite (roseki), alumina, zircon, silicon carbide and similar materials, and the principal materials which have been employed as binders are tars such as anhydrous tar, tar for pavement, cutback tar (converted tar) as well as pitch and athracene.

The greatest advantage of employing tars, pitch or similar materials is mainly due to their plasticity and resistance to corrosion. These tars, however, tend to harden and become so hard that if a long period of time elapses from the mixing of the above compositions for taphole materials until the actual operation of the furnace, is becomes impossible to extrude these compositions from the applicator or extruder, which is called a "mud gun". Consequently, undesirable phenomena which are referred to as "extrusion incapability" are apt to occur and result in a condition of unstable operation of the furnace. Furthermore, tars which are used as binders of the compositions for refractory plugs are heated to such an extent that they begin to burn during the operation of the furnace and generate a yellowish black smoke which is bad smelling and is a source of pollution not only of the area surrounding the blast furnace but also of the atmosphere, that is, it is a source of environmental pollution. In addition to this problem, laborers who come in contact with the tars or the vapors thereof during the mixing of the above compositions for refractory plugs or during the operation of the blast furnaces suffer from inflammation of the skin, which is a significant safety problem in the working conditions of the factory. Also, tars are designated by law as specific chemical materials which require circumspection in manufacturing processes due to their polluting qualities and it is necessary that great care be taken when handling them.

In order to overcome these defects, compositions for refractory plugs which compositions contain plastics as binding materials have been advocated. However, most plastics which are used as binding materials are aromatic compounds and when burned they may release volatile constituents which are said to be harmful to health. Therefore, the problem of pollution has not yet been completely eliminated.

With this background, the present invention is intended to solve problems encountered in the routine operation of blast furnaces as well as to eliminate environmental pollution.

Thus, it is an object of this invention to provide improved compositions for refractory plugs used to plug the tapholes of blast furnaces which compositions do not readily stiffen even after the lapse of a long period of time without being used.

Another object of this invention is to provide improved compositions for refractory plugs used to plug the tapholes of blast furnaces which compositions will not cause environmental pollution which occurs when conventional compositions for refractory plugs are burned during the service of the furnace.

The improved compositions for refractory plugs in accordance with the present invention are characterized by the use of a specified amount of at least one petroleum pitch which has a high softening point and is used as the binder and a specified amount of at least one alcohol selected from the group consisting of dihydric alcolhols and polymers thereof and is used as the agent which imparts workability or plasticity to the composition; these constituents are mixed with a refractories aggregate which has a conventional proportion and range of particle sizes.

Other objects and advantages of the invention will readily become apparent by a thorough consideration of a preferred embodiment thereof.

DETAILED DESCRIPTION OF THE INVENTION

Figure 1:
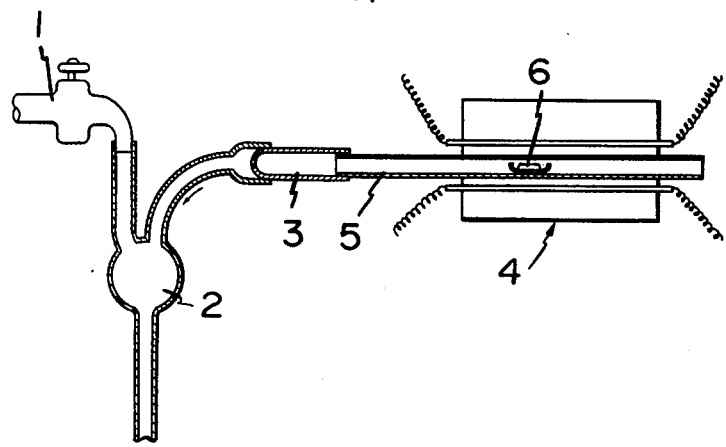
FIG. 1 is an elevation, partly schematic, partly in section, of an experimental apparatus which is used for the smoking test of the product according to the present invention.

In FIG. 1, there is shown water tap 1, aspirator 2, cylindrical filter paper 3, electric furnace 4, ceramic tube 5 and specimen 6, which are assembled in a self-evident manner.

The temperature in the furnace 4 is mainained at 800° C and the product which is generated by the combustion of the specimen 6 can be observed and can be analyzed by conventional techniques. Flow of water from the tap 1 through the aspirator 2 pulls air and, therewith, the products of combustion into the aspirator from the ceramic tube 5 which passes through the furnace 4. Gross particulate matter is filtered out by the cylindrical filter paper 3. Accordingly, by comparing the blackness of the filter paper with the standard specimen it will be possible to determine whether the tested material is suitable or not for the binding material.

The aggregate materials used in the present invention are conventional aggregate materials such as carbon (coke), silicon carbide and aluminous materials, including high alumina content materials, chamotte, pyrophyllite (roseki) and clay as well as zircon. These materials can be employed in a composition of conventional proportions and ranges of particle sizes based upon a consideration of the objectives, the operating conditions and the capacity of the furnace.

Particle size ranges and proportions may be as shown in the following tabulation:

| | |
|---|---|
| 1 – 4 mm | 10 – 30% |
| 0.5 – 1 mm | 10 – 12% |
| 0.21 – 0.5 mm | 10 – 15% |
| 0.074 – 0.21 mm | 15 – 24% |
| under 0.074mm | 30 – 45% |

All proportions in this specification are by weight unless otherwise indicated.

Generally speaking, materials containing moisture are not suitable as the materials for refractory plugs according to the invention. Therefore the aggregate materials to be used should be employed immediately after dehydration, that is, drying. When coke is to be employed as the aggregate material, it is especially important that the coke be sufficiently dehydrated by keeping the material at 80 ° – 100° C for a sufficient time before incorporation in the composition of the invention. Accordingly, if a pitch having a low softening point as in the prior art would be used in the present invention it would tend to melt and soften to some extent, which would cause a change in the viscosity of the refractory plug and satisfactory operation would become difficult.

An important feature of the present invention is the use of petroleum pitch which has a softening point higher than 150° C and lower than 230° C. The reason why the upper limit of the softening point is specified at 230° C is as follows. It is assumed that the temperature of the outer wall of the taphole is about 250° C at the beginning of the operation of the furnace; therefore, it is necessary to use pitch which melts or solidifies under 250° C. If the pitch has a softening point higher than 250° C, it tends to lengthen the time required to plug the taphole by means of an extruder. There is also the possibility of being unable to remove the used compositions for refractory plugs from the hole.

The petroleum pitches which may be used are preferably those which are prepared from crude oil by heating it at a high temperature for a short period of time in a cracking oven. The hydrogen/carbon ratio is within the range of 0.045 and 0.055 which is lower than that of coal pitches and the thusly prepared pitches have the following properties:

| | |
|---|---|
| true specific gravity | 1.25 – 1.40 |
| coking carbon | 65 – 70% |
| softening point | 150 – 230° C |
| benzol insoluble matter | 55 – 65% |
| quinoline insoluble matter | 15 – 35% |

It is convenient to use pitches with a softening point in the range of 150°– 230° C since they do not undergo any change in properties at the temperatures at which materials of refractory plugs are mixed.

Furthermore, pitches which contain large amounts of fixed carbon and also benzol or quinoline insoluble matter do not emit dense smoke during combustion and are convenient for forming carbon bonded refractories.

If the amount of petroleum pitches with the above properties which is to be added to 100 parts by weight of the refractories aggregate composition is less than 5 parts, enough strength cannot be developed in the composition for refractory plugs. If, on the other hand, the amount is more than 30 parts by weight, enough strength can be developed but the texture will become too porous which is undesirable for refractory plugs.

As noted above, a dihydric alcohol or polymer thereof is used as the agent imparting workability to the compositions for refractory plugs as well as the binding agent.

Dihydric alcohols and polymers thereof have the following advantages:

1. volatilization thereof is difficult at room temperature and they possess properties which are resistant to change at room temperature over a long period of time;

2. they are incompatible with petroleum pitch;

3. they help form a composition for refractory plugs which is capable of being easily extruded (in a lump) by means of an extruder into the taphole of a blast furnace; therefore, alcohols and polymers thereof which are used herein preferably should be in a liquid state and have as high a viscosity as possible at room temperature;

4. they are inflammable and during combustion at a comparatively low temperature become a volatile and inflammable gas which burns without emitting toxic products and heavily colored smoke.

If the workability imparting agent would be compatible with petroleum pitch, the operation would become difficult due to a change in viscosity caused by dissolving the pitch. The softening point of the mixture of pitch and the agent imparting workability will tend to be lowered and a change in properties of the mixture or the composition for refractory plug will take place during storage thereof.

As the liquids which best conform with the above requirements, such dihydric alcohols as monoethyleneglycol, diethyleneglycol, monopropyleneglycol and dipropyleneglycol and polymers thereof such as polyethyleneglycol and polypropyleneglycol are preferred in this invention. As a polyethyleneglycol, polymers which have a molecular weight in the range of 200 to 400 and are in the liquid state can be employed in this invention. As a polypropyleneglycol, polymers which have a molecular weight of less than 1000 and are in a liquid state can be also employed. Polyethyleneglycol in particular is not compatible with petroleum pitch and has surface active properties due to its lipophilic radical as well as a hydrophilic radical and is the most suitable for use as the agent imparting workability in the composition for refractory plugs of this invention. Other dihydric alcohols such as trimethyleneglycol, 1,4-butanediol and similar alcohols are suitable.

If the amount of these dihydric alcohols and polymers thereof to be added per 100 parts by weight of the refractories aggregate composition is less than 10 parts by weight, workability (capability of being extruded, plasticity and softness) of the composition for refractory plugs will not be developed, and if on the other hand, it is more than 30 parts by weight, workability will be increased so much that the composition will not be capable of being extruded properly and will be so soft that leakage at the taphole is apt to occur.

In addition, the properties of these compositions for refractory plugs are apt to deteriorate.

The compositions for refractory plugs according to this invention are superior to the compositions of the prior art with respect to shelf life or stability and will not harden so much that they cannot be extruded into the taphole of the furnace by an extruder after a long period of storage. In addition, the potential for the emission of smoke and harmful gas is low.

In addition to this, the compositions for refractory plugs according to the present invention are not by any means inferior to the compositions of the prior art when comparing strength during heating and modulus of rupture during heating. But far from that they are superior to the latter in these points.

The following are non-limiting examples of the present invention.

EXAMPLE 1

Prior to the mixing of the material, the mixture of refractories aggregate was heated up to 55° C. After preparing the compositions for refractory plugs of the following formulations of the present invention, S-5, S-10, and S-15, by mixing the hereinbelow tabulated kinds and proportions by weight of the materials in an experimental mixer, comparative examination was made of the properties of each refractory plug after firing. As a control, formulation of the prior art, T, which contained converted tar as a binding material was employed. In the table, the proportions of binding material and agent imparting workability are given in parts by weight and the composition of the refractory aggregate is given in percentages by weight, the refractory aggregate in each instance constituting the balance of the composition for refractory plugs.

| name of material | | formulation | | | |
|---|---|---|---|---|---|
| | | T | S-5 | S-10 | S-15 |
| refractory aggregate | high alumina material | 40% | | | |
| | silicon carbide | 18 | | | |
| | coke | 17 | same | same | same |
| | fire clay | 15 | | | |
| | pyrophyllite | 10 | | | |
| binding material | converted tar | 18 | | | |

| name of material | formulation | | | |
|---|---|---|---|---|
| | T | S-5 | S-10 | S-15 |
| petroleum pitch | | 5 | 10 | 15 |
| polyethyleneglycol | | 18.5 | 19.5 | 20.0 |

| | |
|---|---|
| petroleum pitch | |
| true specific gravity | 1.30 |
| softening point | 150 – 230° C |
| benzene insoluble matter | 60% |
| quinoline insoluble matter | 25% |
| elementary analysis | C 95.0% : H 4.0% : S 0.2% : ash 0.3% |
| converted tar | |
| benzene insoluble matter | 35% |
| quinoline insoluble matter | trace |
| elementary analysis | C 92.3% : H 4.4% : N 13.% : S 0.3% : ash 0.02% |
| polyethyleneglycol | |
| colorless and transparent liquid; specific gravity | 1.126 |
| average molecular weight | 304 |
| flashing point | 202° C |
| solidifying point | −13° C |
| viscosity (S.C.) | 5.73 |
| pH | 5.7 |

Specimens for the tests of modulus of rupture, crushing strength and strenth during heating, the results of which tests are given in the following table, were shaped test pieces of 40 × 40 × 160 mm which were molded under a pressure of 70 kg/cm$^2$ and fired in a nitrogen atmosphere. Those for determining the general properties of the fired specimens were the same shape and molded under the same pressure as described above and fired in a "coke breeze" oven, that is, a reducing atmosphere. The extruding pressures given in the table are pressures for extruding the compositions for refractory plugs from a "mud gun".

| | | T | S-5 | S-10 | S-15 |
|---|---|---|---|---|---|
| extruding pressure (at 50° C) | starting pressure (kg/cm$^2$) | 2.6 | 4.1 | 4.2 | 4.2 |
| | mean pressure (kg/cm$^2$) | 4.1 | 5.0 | 5.0 | 5.1 |
| | maximum pressure (kg/cm$^2$) | 4.6 | 5.6 | 5.6 | 5.7 |
| property of the product sintered | | | | | |
| at 300° C for 1 hr | modulus of rupture (kg/cm$^2$) | 11.4 | 0.8 | 1.1 | 4.2 |
| | crushing strength (kg/cm$^2$) | 17.0 | 1.0 | 1.0 | 3.0 |
| at 600° C for 10 min | modulus of rupture (kg/cm$^2$) | 4.4 | 2.8 | 6.1 | 17.1 |
| | crushing strength (kg/cm$^2$) | 6.0 | 3.0 | 15.0 | 26.0 |
| at 1200° C for 3 hr | modulus of rupture (kg/cm$^2$) | 33.5 | 8.6 | 11.1 | 35.2 |
| | crushing strength (kg/cm$^2$) | 60.0 | 36.0 | 49.0 | 100.6 |
| properties of fired specimen | apparent specific gravity | 2.98 | 2.97 | 2.86 | 2.78 |
| | bulk specific gravity | 2.02 | 1.90 | 1.77 | 1.84 |
| | apparent porosity(%) | 31.9 | 35.9 | 37.9 | 36.4 |
| | permanent linear change coefficient (%) | −0.86 | −0.56 | −0.67 | −0.64 |
| modulus of rupture at high temperature (kg/cm$^2$) | at 1200° C for 1 hr | 18.6 | 5.9 | 15.4 | 24.5 |
| | at 1450° C for 1 hr | 6.7 | 1.5 | 2.9 | 12.3 |

As shown by the above table, the properties of the compositions for refractory plugs of the invention are not at all inferior to those of the compositions of the prior art which used coal tar as a binding material. The composition for refractory plugs, S-15, which was prepared by adding 15 parts by weight of petroleum pitch and 20 parts by weight of polyethyleneglycol to 100 parts by weight of refractories aggregate and mixing them was extraordinarily superior to that of the prior art with respect to strength and modulus of rupture on heating.

Furthermore with respect to the characteristics of the refractory plugs of the present invention, especially stability and starting pressure in extrusion, a comparison was made with those of the prior art. The results are as follows:

Table showing the relationship of temperature and starting pressure in extrusion

| heating temperature (° C) | | 30 | 40 | 50 | 60 | 70 | 80 |
|---|---|---|---|---|---|---|---|
| starting pressure in extrusion (kg/cm$^2$) | refractory plug of the prior art | 7.8 | 4.9 | 4.6 | 4.0 | 3.7 | 2.4 |
| | that of the present invention S-10 | 5.6 | 5.3 | 5.0 | 4.8 | 4.8 | 4.7 |

Table showing the relation of starting pressure in extrusion and lapse of time (stability)

| lapse of time (days) | | immediately after mixing | after 1 day | 2 days | 3 days | 4 days | 5 days | 6 days |
|---|---|---|---|---|---|---|---|---|
| starting pressure in extrusion (kg/cm$^2$) | refractory plug of the prior art | 2.7 | 3.2 | — | 5.8 | — | 6.2 | 7.2 |
| | that of the present invention (S-10) | 4.3 | 4.6 | — | 4.9 | — | 5.0 | 5.3 |

Comparatively speaking, with respect to stability, starting pressure in extrusion of the refractory plug of the prior art was 2.7 kg/cm$^2$ immediately after mixing and increased to 7.2 kg/cm$^2$ after 6 days. On the other hand starting pressure in extrusion of the refractory plug of the present invention was 4.3 kg/cm$^2$ immediately after mixing and increased to 5.3 kg/cm$^2$ after 6 days, which shows that stability of the refractory plug of the invention is exceedingly superior to that of the prior art.

The starting pressure at 30° C of the refractory plug of the prior art was 7.8 kg/cm$^2$ and that at 70° C was 3.7 kg/cm$^2$. In contrast to the prior art, the starting pressure at 30° C of the refractory plug of the present invention was 5.6 kg/cm$^2$ and that at 70° C was 4.8 kg/cm$^2$. This shows that the change of the starting pressure with temperature of the refractory plug of the present invention is very small which vividly proves its superiority.

One great advantage of this invention is the low smoke emission of the refractory plug of the present invention as compared to that of conventional refractory plugs of the prior art. The emission of smoke when burning the refractory plug of this invention is quite low as compared with that of the conventional one.

Smoke emission tests conducted by burning refractory plugs made from compositions of this invention, for example in the experimental apparatus of FIG. 1, did not produce black smoke as did the conventional refractory plugs.

Accordingly, the problems of environmental pollution and health risks for laborers have been substantially eliminated by carrying out this invention.

What is claimed is:

1. Compositions for refractory plugs of blast furnaces comprising 100 parts by weight of a refractories aggregate composition, as a binder 5–30 parts by weight of at least one petroleum pitch which has a softening point of 150°–230° C and 10 – 30 parts by weight of at least one alcohol selected from the group consisting of polyethyleneglycol and polypropyleneglycol.

2. Compositions for refractory plugs of blast furnaces according to claim 1, wherein said alcohol is polyethyleneglycol.

3. Compositions for refractory plugs of blast furnaces according to claim 1, wherein said alcohol is polypropyleneglycol.

4. Compositions for refractory plugs of blast furnaces according to claim 1, in which the refractories aggregate composition is constituted of particles of the following sizes in the following proportions by weight:

| 1 | — | 4 mm | 10–30% |
|---|---|---|---|
| 0.5 | — | 1 mm | 10–12% |
| 0.21 | — | 0.5 mm | 10–15% |
| 0.074 | — | 0.21 mm | 15–24% |
| under 0.074mm | | | 30–45% |

5. Compositions for refractory plugs of blast furnaces according to claim 1, in which the petroleum pitch has the following additional properties:

| true specific gravity | 1.25–1.40 |
|---|---|
| coking carbon | 65–70% |
| benzol insoluble matter | 55–65% |

| | |
|---|---|
| quinoline insoluble matter | 15–35% |

6. Compositions for refractory plugs of blast furnaces according to claim 4, in which the petroleum pitch has the following additional properties:

| | |
|---|---|
| true specific gravity | 1.25–1.40 |
| coking carbon | 65–70% |
| benzol insoluble matter | 55–65% |
| quinoline insoluble matter | 15–35% |

* * * * *